(12) United States Patent
Takayanagi

(10) Patent No.: US 7,110,132 B2
(45) Date of Patent: Sep. 19, 2006

(54) PRINTING APPARATUS, ITS CONTROL METHOD, PRINT SYSTEM, PROGRAM, AND MEMORY MEDIUM

(75) Inventor: Masahiro Takayanagi, Gunma (JP)

(73) Assignee: Canon Kabushiki Kaisha, Tokyo (JP)

( * ) Notice: Subject to any disclaimer, the term of this patent is extended or adjusted under 35 U.S.C. 154(b) by 900 days.

(21) Appl. No.: 10/162,603

(22) Filed: Jun. 6, 2002

(65) Prior Publication Data

US 2003/0007172 A1    Jan. 9, 2003

(30) Foreign Application Priority Data

Jun. 12, 2001   (JP)   ............... 2001-177356

(51) Int. Cl.
*G06K 15/00* (2006.01)
*G06F 15/00* (2006.01)
*H04M 11/00* (2006.01)

(52) U.S. Cl. ............ 358/1.15; 358/1.13; 358/1.1; 379/93.02; 379/93.24; 379/100.08

(58) Field of Classification Search ............... 358/1.15, 358/1.13, 1.1, 402; 709/219; 379/93.02, 379/100.08, 93.24; 711/164
See application file for complete search history.

(56) References Cited

U.S. PATENT DOCUMENTS 6,801,935 B1 * 10/2004 Shen .................... 709/219

\* cited by examiner

*Primary Examiner*—King Y. Poon
*Assistant Examiner*—Thomas J Lett
(74) *Attorney, Agent, or Firm*—Fitzpatrick, Cella, Harper & Scinto

(57) ABSTRACT

A printing apparatus or the like which can print by a simple hardware construction while security is assured and the operability is maintained is provided. A printer receives a print job which is sent from a host computer, holds it into a memory unit, generates an E-mail with a key code corresponding to the print job including the key code of each print job, and sends it to a cell phone designated upon job reception via a mail server through an LAN. In the cell phone which received the E-mail, when the user wants to print, contents of the E-mail are not changed but reply mail corresponding thereto is returned to the printer. In the printer which received the reply mail, if the key code included in the E-mail with the key code coincides with a key code included in the reply mail, the printing of the corresponding print job is started.

10 Claims, 6 Drawing Sheets

FIG. 4

```
To : user@keitai.co.jp
Subject : Security Key of File
         "Secret.doc"

Reply to this mail will
start printing of
Secured Job "Secret.doc"

Key Code : AZXR293D
```

FIG. 5

```
To : lbp1@printer.co.jp
Subject : Re : Security Key of File "Secret.doc"

> Reply to this mail will
> start printing of
> Secured Job "Secret.doc"

> Key Code : AZXR293D
```

FIG. 8

Secured Job Print Menu
_____

Print Waiting Job
aaa.doc
bbb.doc

Entering password will start printing ☐

PRINTING APPARATUS, ITS CONTROL METHOD, PRINT SYSTEM, PROGRAM, AND MEMORY MEDIUM

BACKGROUND OF THE INVENTION

1. Field of the Invention

The invention relates to a printing apparatus having what is called "Secured Print function" for permitting a printing process only to a specific user in order to assure security. The invention also relates to a control method for such a printing apparatus, a print system, a program, and a memory medium.

2. Related Background Art

Hitherto, a printing apparatus having what is called "Secured Print function" for permitting a printing process only to a specific user in order to assure security has been known. In such an apparatus, in order to authenticate the user, for example, a method of using a dedicated card (Secured card) at the time of instructing the start of printing, a method of entering a password from a panel of the apparatus, or the like is used.

According to the above conventional printing apparatus, however, in case of using the authenticating method by the dedicated card, there is a problem such that it is necessary to arrange a card reader at a position near the printing apparatus, or the like, so that a hardware construction becomes complicated. Since it is necessary to prepare the dedicated card for everyone of a plurality of users, there is a problem such that large costs are necessary.

In case of using the method of entering the password on the panel, although it is necessary to enter numerals or alphabets, there is a problem such that an operability of the entering is low on a simple panel in a cheap printing apparatus without a keyboard or the like. Further, if there is a problem such that the user forgets the password, he cannot execute the printing.

SUMMARY OF THE INVENTION

The invention is made to solve the problems of the foregoing conventional techniques and it is an object of the invention to provide a printing apparatus, its control method, a print system, a program, and a memory medium, in which printing can be performed by a simple hardware construction while security is assured and the operability is maintained.

To accomplish the above object, according to the invention, there is provided a printing apparatus which is connected to a host computer via a network and can send and receive E-mail by using a mail server function, comprising: job receiving means for receiving a print job from the host computer; job retaining means for retaining the print job received by the job receiving means; mail generating means for generating transmission mail including a predetermined key code in correspondence to the print job retained by the job retaining means; mail sending means for sending the transmission mail generated by the mail generating means at a specific mail address by E-mail; mail receiving means for receiving reply mail to the transmission mail sent by the mail sending means; and permission/inhibition determining means for determining permission or inhibition of printing of the print job retained by the job retaining means on the basis of the predetermined key code included in the transmission mail sent by the mail sending means and a key code included in the reply mail received by the mail receiving means.

In the construction disclosed above, if the predetermined key code included in the transmission mail sent by the mail sending means coincides with the key code included in the reply mail received by the mail receiving means, the permission/inhibition determining means permits the printing of the print job corresponding to the predetermined key code.

In the construction disclosed above, when the print job is received by the job receiving means, the specific mail address is designated on the host computer side.

In the above construction, the printing apparatus further comprises registering means for preliminarily registering the specific mail address.

In the above construction, the specific mail address is an address of a cell phone.

In the above construction, the predetermined key code differs every print job and is set when the transmission mail is generated by the mail generating means.

In the above construction, the predetermined key code differs every specific mail address and is set when the transmission mail is generated by the mail generating means.

In the above construction, the mail server function is realized by either mail server means provided in the printing apparatus or a mail server apparatus connected to the network.

To accomplish the above object, according to the invention, there is provided a printing apparatus which is connected to a host computer via a network and can allow a home page to be browsed by using an Internet server function, comprising: job receiving means for receiving a print job from the host computer; password accepting means for accepting entering of a password on the home page; authenticating means for authenticating the password accepted by the password accepting means; and permitting means for permitting printing of the print job corresponding to the password authenticated by the authenticating means among the print jobs received by the job receiving means.

In the above construction, the password differs every print job and, when the print job is received by the job receiving means, the password is designated on the host computer side.

In the above construction, the printing apparatus further comprises registering means for preliminarily registering the password every user.

In the above construction, the printing apparatus further comprises job retaining means for retaining the print job received by the job receiving means, and the password accepting means allows information for specifying the print job retained by the job retaining means to be displayed on the home page and accepts the password every print job.

In the above construction, it is possible to access the home page from a cell phone via the Internet.

In the above construction, the home page has been stored in at least one of the printing apparatus and the host computer.

In the above construction, the Internet server function is realized by either Internet server means provided in the printing apparatus or an Internet server apparatus connected to the network.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 4 is a diagram showing an example of E-mail with a key code which is displayed on a cell phone side;

FIG. 5 is a diagram showing contents of reply mail returned from the cell phone;

FIG. 8 is a diagram showing an example of a home page which is displayed on a display of the cell phone.

DETAILED DESCRIPTION OF THE PREFERRED EMBODIMENTS

Embodiments of the invention will now be described hereinbelow with reference to the drawings.

(First Embodiment)

In the embodiment, the start of printing of "Secured print" in which only the specific user is permitted to execute a printing process for the purpose of assuring security is instructed by using E-mail. That is, the E-mail is used as a print key, thereby allowing reply mail to the E-mail to be used as an instruction to start the printing.

Figure 1:
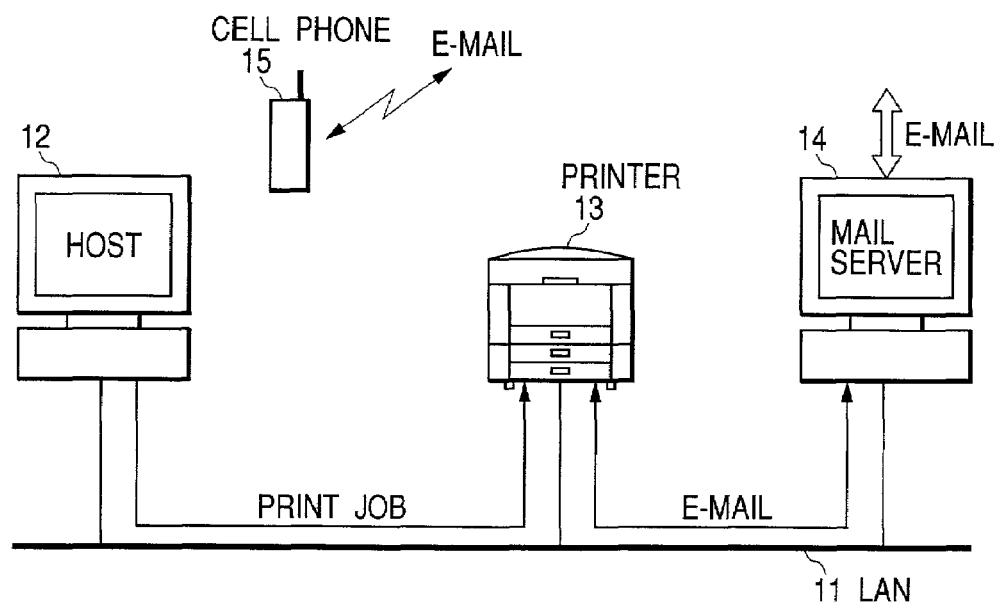
FIG. 1 is a block diagram showing a whole construction of a print system including a printing apparatus according to the first embodiment of the invention.

FIG. 1 is a block diagram showing a whole construction of a print system including a printing apparatus according to the first embodiment of the invention.

In the diagram, reference numeral 11 denotes an LAN implemented in an office or the like of the user; 12 a host computer (also referred to as a host) which is used by the user on the LAN 11; 13 a printer (printing apparatus) having a mail sending and receiving function and similarly connected to the LAN 11; 14 a mail server which is provided on the LAN 11 and used for sending and receiving E-mail to/from the outside; and 15 a cell phone (terminal apparatus) which the user (the invention is not limited to the user of the host 12) possesses. It is possible that a number of host computers 12 with a similar construction exist on the LAN 11.

Figure 2:
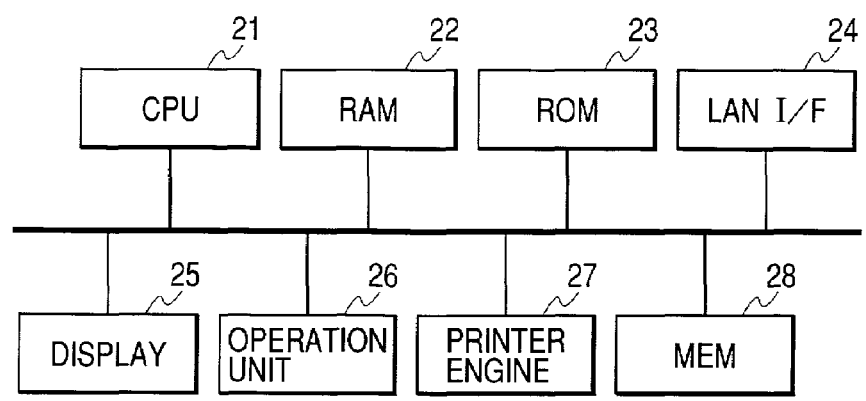
FIG. 2 is a block diagram showing an internal construction of a printer.

FIG. 2 is a block diagram showing an internal construction of the printer 13.

The printer 13 is constructed by connecting an RAM 22, an ROM 23, an LAN I/F (interface) 24 (job receiving means, a part of mail sending means, a part of mail receiving means), a display 25, an operation unit 26, a printer engine 27, and a memory unit 28 (job retaining means, registering means) to a CPU 21 (mail generating means, permission/inhibition determining means, a part of mail sending means, a part of mail receiving means) via a bus.

The CPU 21 controls the whole printer 13. The RAM 22 temporarily stores various data. A control program which is executed by the CPU 21 is stored into the ROM 23. The LAN I/F 24 is connected to the host 12 via the LAN 11 and also connected to the mail server 14, thereby enabling the printer 13 to use an E-mail sending and receiving function of the mail server 14. The display 25 is constructed by an LCD or the like and displays various information. The operation unit 26 is used to input various instructions. The printer engine 27 executes the printing. The memory unit 28 is constructed by, for example, a hard disk and used to hold programs and various data.

Although not shown, the mail server 14 has a CPU, an RAM, an ROM, a communication I/F (interface), a hard disk, a display, an entering unit, and the like and can send and receive E-mail. The cell phone 15 can send and receive E-mail to/from the mail server 14.

Figure 3:
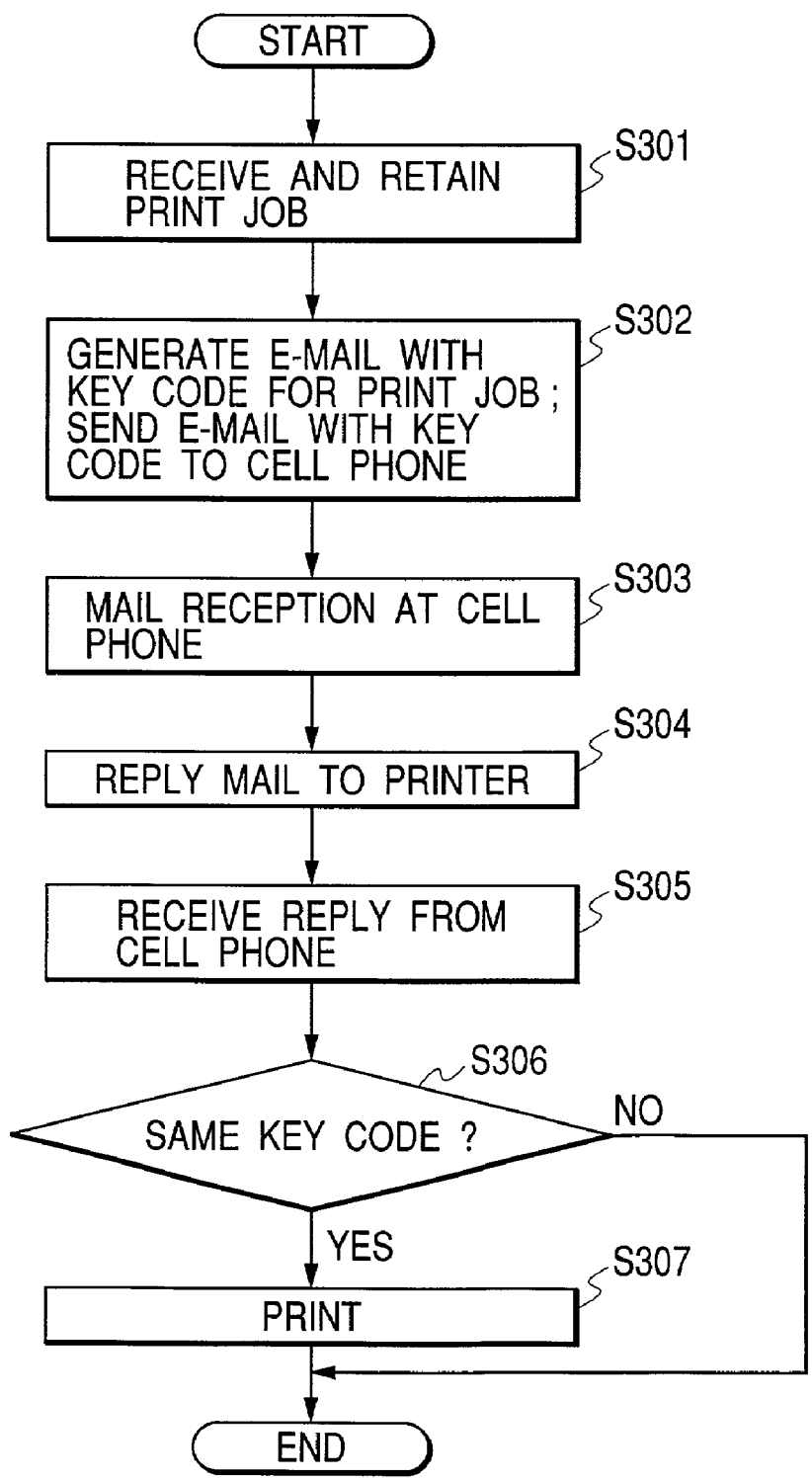
FIG. 3 is a diagram showing a flowchart for a printing process in the embodiment.

FIG. 3 is a diagram showing a flowchart for the printing process in the embodiment.

First, the printer 13 receives a "Secured Job" (print job which is permitted only to the specific user for the purpose of assuring security (hereinafter, simply referred to as a "print job")) which is sent from the host 12 via the LAN 11 and retains it into the memory unit 28 (step S301).

Subsequently, in step S302, the printer 13 generates E-mail with a key code including a key code (KeyCode) corresponding to the received print job and sends the generated E-mail with the key code to the cell phone 15 via the mail server 14 through the LAN 11.

In the embodiment, it is assumed that an E-mail address of the cell phone 15 on the sending destination side of the E-mail with the key code is designated by the user of the host 12 (hereinafter, simply referred to as a "host user") when the print job is sent from the host 12. Therefore, the E-mail address of the cell phone 15 on the sending destination side can differ every print job which is sent. In the embodiment, the key code is set every print job when the E-mail with the key code is generated on the printer 13 side.

Subsequently, the E-mail with the key code is received on the cell phone 15 side and its contents are displayed on a display (not shown) of the cell phone 15 (step S303).

FIG. 4 is a diagram showing an example of E-mail with a key code which is displayed on the cell phone 15 side.

As shown in the diagram, a mail address of the user of the cell phone 15 (hereinafter, simply referred to as a "cell phone user") is described in "To". Information showing to which print job the key (Key) corresponds is written into "Subject". A message showing that the printing is started by replying the mail has been described in the text (body). Lastly, the key code is described (in the diagram, the key code is "AZXR293D").

Returning to FIG. 3, in the cell phone 15 which received the E-mail with the key code, if the user wants to print, the reply mail to the E-mail with the key code is returned to the printer 13 (step S304). That is, if the cell phone user wants to print, he operates the cell phone 15 and replies the E-mail with the key code. As will be explained hereinlater, since the printing is performed by the printer 13, the cell phone user ordinarily goes to a place near the printer 13 and executes the replying operation there, so that he can promptly obtain desired printed matter.

Subsequently, the printer 13 receives the reply mail from the cell phone 15 (step S305) and discriminates whether the key code included in the sent E-mail with the key code coincides with the key code included in the reply mail returned in correspondence to the E-mail or not (step S306). That is, when the reply mail is received, the printer 13 automatically reads the key code in the reply mail and discriminates whether the same key code as that included in the sent mail is included or not.

FIG. 5 is a diagram showing contents of the reply mail returned from the cell phone 15.

Although symbols such as ">" and the like are automatically inserted in the reply mail as shown in the diagram, the printer 13 side ignores them and reads a character string written after "Key Code:" as a password. Therefore, the cell phone user needs to reply the mail as it is without changing the contents of the E-mail with the key code (at least, the line of the key code must not be changed).

It is also possible to allow the key code to be included in "Subject". In this case, although it is necessary that the contents in "Subject" are not changed, there will be no problem even if the text is changed by the user.

Returning to FIG. 3, if it is determined as a result of the discrimination in step S306 that the key code included in the E-mail with the key code coincides with the key code included in the reply mail, the printing of the corresponding print job among the retained print jobs, that is, the printing of the print job specified by "Subject" here is started (step S307). Thus, the cell phone user of the cell phone 15 which received the E-mail with the key code can allow the printer 13 to execute a printing process of the corresponding print job. On the other hand, if the key code included in the E-mail with the key code does not coincide with the key code included in the reply mail, the processing routine is finished without printing.

According to the embodiment, the apparatus is constructed in a manner such that the printer 13 can use the mail sending and receiving function of the mail server 14. When the print job is received, it is retained and the E-mail with the key code corresponding to such a job is sent to the cell phone 15. If the original key code is included in the reply mail, the execution of the retained print job is permitted. That is, the start of the printing is instructed by using the cell phone which the cell phone user possesses. Therefore, since there is no need to prepare new hardware for the purpose of performing the user authentication, costs for the hardware are unnecessary. Since the cell phone user can instruct the start of the printing merely by replying the E-mail with the key code as it is, simple printing means with high operability can be provided to the user. Thus, the printing can be executed by the simple hardware construction while security is assured and the operability is maintained.

Since a condition that the different key code is used every print job is used as a prerequisite in the embodiment, for example, if the same host user sent five print jobs, one E-mail with the key code is generated and sent every job and each key code included in the E-mail with the key code is different. Therefore, the cell phone user can execute the printing in desired order irrespective of the order of generation of the print jobs.

The different key code can be also set every cell phone user (every address of the cell phone 15). That is, in case of the same cell phone user, the same key code is set with respect to any print job. Consequently, on cell phone user's side, with respect to a plurality of print jobs in a waiting state, the start of the printing can be instructed by one reply of the E-mail. It is sufficient that the key code in this case is automatically set, for example, when the E-mail with the key code is generated.

It has been described as a prerequisite in the embodiment that the condition that the reply mail is returned by using the mail address of the cell phone 15 which received the E-mail with the key code. In the case where the mail has been returned from a different mail address, the following two kinds of measures which can be taken by the printer 13 exist.

According to one of the corresponding methods, the reply mail is ignored and the printing is not performed. That is, if the "To" address of the E-mail with the key code sent to the cell phone 15 of the user is not included in a "From" address of the reply mail, the printing is uniformly rejected. According to such a specification, even if the key code is seen by the third party, the printing cannot be performed by other computer or cell phone. Therefore, there is an advantage such that security level can be enhanced.

According to the other measure, whether the printing is started or not is discriminated merely by collating the key code irrespective of the "From" address of the reply mail. According to this method, for example, there is an advantage such that even if the cell phone 15 is outside of a service area when the user intends to print, it is possible to substitute another E-mail sending means existing at hand for such a cell phone 15.

In the embodiment, each time the print job is sent, the mail address on the sending destination side of the E-mail with the key code is designated on the host 12 side and the E-mail is simultaneously sent. However, the invention is not limited to such a construction but the mail address of the specific cell phone 15 can be also preliminarily registered into the printer 13. In this case, for example, it is sufficient that when the mail address of the cell phone 15 is registered, information of the mail address is sent to the printer 13, stored into, for example, the memory unit 28 on the printer 13 side, and registered as a registration address. If the host user coincides with the cell phone user in this instance, the registration address can be also registered in correspondence to the host 12 on a print job generating source side.

Although the embodiment has been shown as an example in the case where the sending destination side of the E-mail with the key code is the cell phone 15, an apparatus such as a host computer or the like can be also set to the destination.

The number of sending destinations of the E-mail with the key code is not limited to one, but a plurality of cell phone users can be set to targets. In this case, it is desirable to construct the apparatus in a manner such that even if the printing is executed by an instruction from a certain cell phone user, the print job is not deleted in the printer 13. It is also possible to use a construction such that the number of times of printing by each user is restricted or a construction such that the printing of a plurality of number of times is permitted. It is also possible to construct the apparatus in a manner such that a command to delete the print job from the printer 13 is prepared and the print job can be deleted via the cell phone 15.

The embodiment has been described on the assumption that the host user and the cell phone user may be different persons. Therefore, if a partner to whom the E-mail with the key code is sent is set a person other than the host user, it is convenient in the case where the use wants to hand printed matter although he does not want to hand an original file to the third party. On the other hand, if a partner to whom the E-mail with the key code is sent is set to the cell phone 15 of the host user himself, the E-mail with the key code can be printed and outputted in secrecy from the third party.

Although the embodiment has been constructed in a manner such that the printer 13 can use the E-mail sending and receiving function of the mail server 14, the E-mail sending and receiving function can be also provided as mail server means in the printer 13, or it is also possible to construct the apparatus in a manner such that another apparatus (for example, host 12, mail server apparatus) is allowed to play such a role and the printer 13 can use it.

(Second Embodiment)

Although the start of the printing of "Secured print" has been instructed by using the E-mail in the first embodiment, in the second embodiment, the start of the printing is instructed by using the Internet, for example, by using an "i-mode" (registered trademark).

Figure 6:
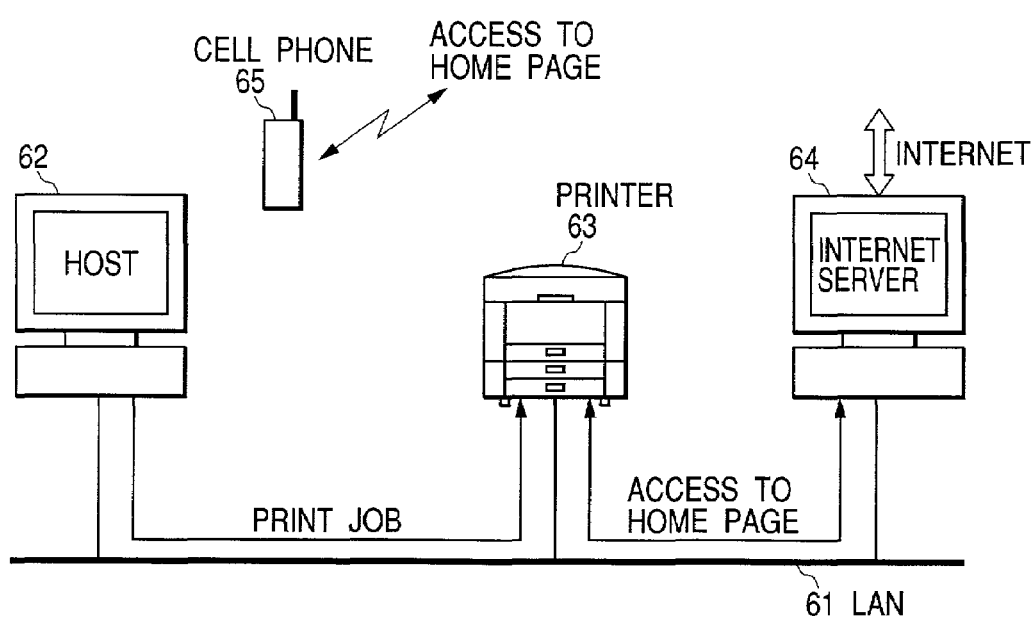
FIG. 6 is a block diagram showing a whole construction of a print system including a printing apparatus according to the second embodiment of the invention.

FIG. 6 is a block diagram showing a whole construction of a print system including a printing apparatus according to the second embodiment of the invention.

In the diagram, reference numeral 61 denotes an LAN implemented in an office or the like of the user; 62 a host computer (also referred to as a host) which is used by the user on the LAN 61; 63 a printer (printing apparatus) which is similarly connected to the LAN 61, and has a URL and a home page therein; 64 an Internet server which is connected to the LAN 61 and executes Internet communication with the outside; and 65 a cell phone (terminal apparatus) which the user possesses. A number of hosts 62 with a similar construction can exist on the LAN 61.

Although not shown, the printer 63 is constructed fundamentally in the same manner as that of the printer 13. That is, the printer 63 is constructed by connecting an RAM 72, an ROM 73, an LAN I/F (interface) 74 (job receiving means, a part of password accepting means), a display 75, an operation unit 76, a printer engine 77, and a memory unit 78 (registering means, job retaining means) to a CPU 71 (a part of the password accepting means, authenticating means, permitting means) via a bus. The LAN I/F 74 is connected to the host 62 via the LAN 61 and connected to the Internet server 64, thereby enabling the printer 63 to use an Internet communicating function of the Internet server 64. The home page is stored into, for example, the memory unit 78.

Although not shown, the Internet server 64 has a CPU, an RAM, an ROM, a communication I/F (interface), a hard disk, a display, an entering unit, and the like and can make the Internet communication. The cell phone 65 is connected to the Internet server 64 in the i-mode and can browse the home page stored in the printer 63.

The second embodiment will be described on the assumption that the user of the host 62 which generates a print job coincides with the user of the cell phone 65 for instructing the start of the printing (hereinafter, each user is simply referred to as a "user").

Figure 7:
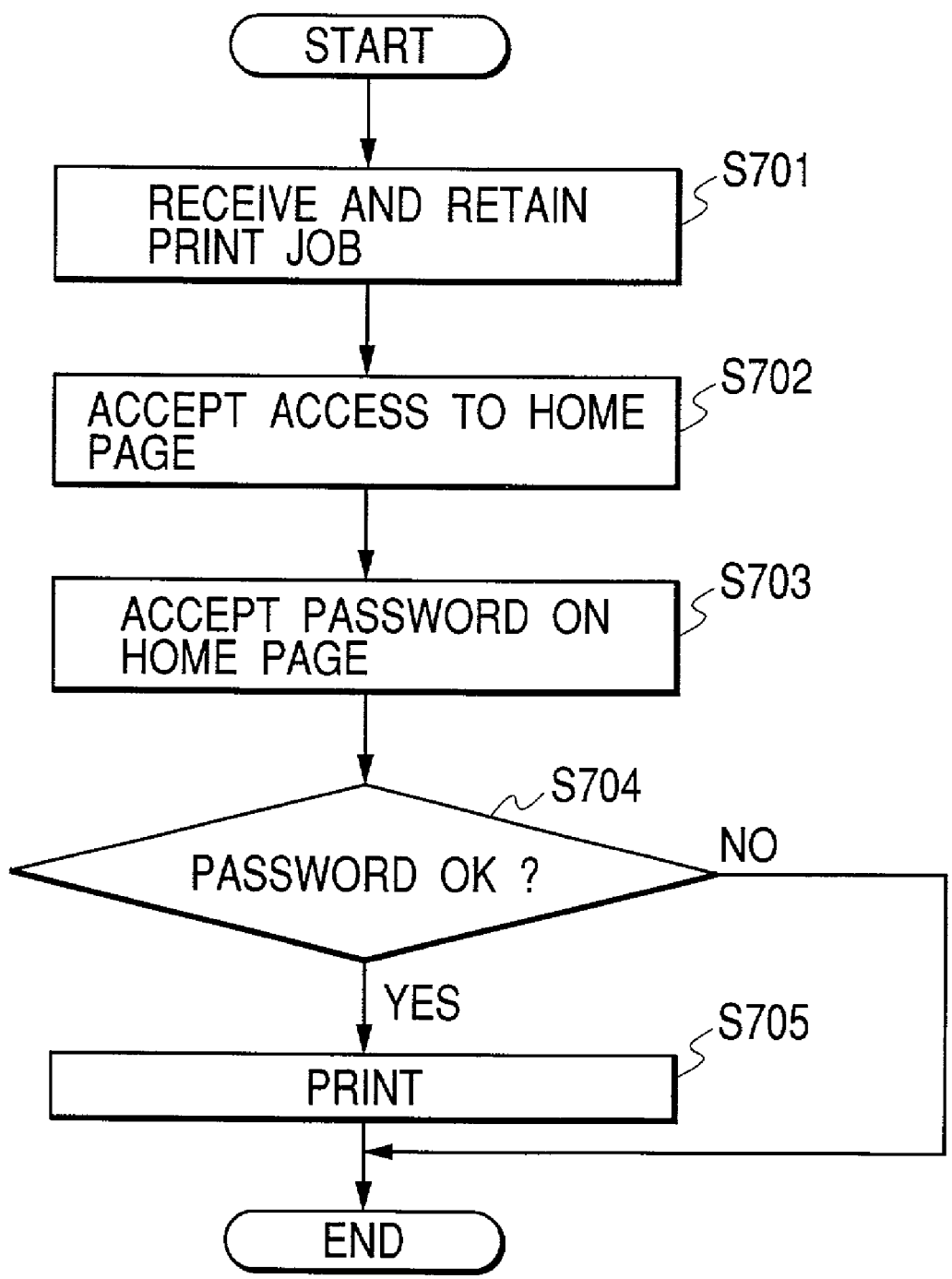
FIG. 7 is a diagram showing a flowchart for a printing process in the embodiment.

FIG. 7 is a diagram showing a flowchart for a printing process in the embodiment.

First, the printer 63 receives the print job which is sent from the host 62 via the LAN 61 and retains it into the memory unit 78 (step S701).

When the user wants to print, he operates the cell phone 65 and accesses the home page in the printer 63 via the Internet server 64 by using an i-mode function. In response to it, the printer 63 accepts an access to the home page via the Internet server 64 to the cell phone 65 which accessed (step S702) and accepts entering of a password on the home page (step S703).

FIG. 8 is a diagram showing an example of a home page which is displayed on the display of the cell phone 65.

As shown in the diagram, all jobs in a print waiting state are displayed on the home page. An entering position of the password is also provided. The user can enter the registered password to the entering position. The password has previously been registered in the printer 63 every user. Upon registration of the password, for example, a password registration menu is prepared on the home page and when the use of the "Secured print" function is started, the password is registered only once. For example, the password is stored into the memory unit 78.

Returning to FIG. 7, subsequently, the printer 63 discriminates whether the password written in the home page is correct or not by collating it with the registered password (step S704). As a result of the discrimination, if it is determined that the password written in the home page is correct, the printing of the print job (all of the print waiting jobs in the embodiment) corresponding to the user is started (step S705). If the password written in the home page is incorrect, the present processing routine is finished without printing. Also in this case, since the print job itself is not cancelled, if the correct password is entered from the home page, the printing is executed.

According to the embodiment, in the case where the print job is sent from the host 62 to the printer 63 and the printing is executed, he accesses the home page in the printer 63 from the cell phone 65 and enters the password on the home page, so that execution of the print jobs in the print waiting state is permitted. Therefore, an effect similar to that in the first embodiment can be obtained.

Contents of the home page are not limited to those shown as an example, but various formats are possible as a display format. For example, the jobs in the print waiting state can be also displayed together with the user name. The invention is not limited to the construction such that all of the print waiting jobs are executed by the entering of the password, but the invention can be also constructed in a manner such that after the password was entered, all or a part of jobs of the user are displayed, and the print job which the user wants to execute the printing can be selected on the picture plane. In this case, the entering of the password does not become the instruction of the start of the printing but the print job selecting operation becomes the instruction of the start of the printing.

Although the password has previously been registered, the password can be also set and registered every print job from a driver or the like of the printer 63 each time the print job is sent. In this case, it is also possible to construct the apparatus in a manner such that on the home page, the entering position of each password is displayed together with information (information to specify the print job) such as a title or the like for specifying each of the print waiting print job groups, then a desired print job is selected and the password is accepted for the selected print job. In this way, the password is accepted for each print job and the printing is executed.

Although the embodiment has been shown with respect to the case where the print job is sent and the entering of the password is accepted in the job retaining state, it is also possible to construct the apparatus in a manner such that the entering of the password is first accepted, and when the print job corresponding to it is received later, the printing is immediately executed.

Although the home page has been stored into the printer 63 and the access to the home page has been accepted by using the function of the Internet server 64, the Internet server means can be also provided in the printer 63, or it is also possible to construct the apparatus in a manner such that the host 62, another network server (Internet server apparatus), or the like functions as a home page server. As an operation which is executed in a case of the construction in which the network server has the home page, when the user enters the password, permission of the start of the printing is given to the printer 63.

As an operation which is executed in a case of the construction in which the host 62 has the home page server, there are the following two kinds of operations. Either of them is selected and executed in accordance with timing for transferring the print job. First, if the print job is sent after the password was entered, since the simple operation such that the printer merely prints the received print job is executed, a countermeasure regarding authentication is unnecessary on the printer side. In this case, an authentication-related process becomes a countermeasure closed on the host side. On the other hand, in the case where, when the print job is sent, the data is retained on the printer 63 side until the start of the printing, and the apparatus waits for the entering of the password, the password is authenticated by the host 62. If it is authenticated, a print instruction is issued to the printer 63. The printer 63 receives such an instruction and, thereafter, executes the printing.

The password can be made to be different every print job. In this case, it is sufficient to designate the password on the host 62 side when the print job is received.

Although the embodiment has been shown as an example with respect to the case where the home page in the printer 63 is accessed in the i-mode, the invention is not limited to such a case but can be also applied to any means which is connected to the Internet. For example, an Internet connection service such as EZweb (registered trademark) by another cell phone or the like can be used.

Although the case of accessing from the cell phone 65 has been shown as an example in the home page in the printer 63, the invention is not limited to such a case but, for example, the home page can be accessed from an apparatus such as a host computer or the like.

Naturally, the object of the invention is accomplished by a method whereby a memory medium in which program codes of software for realizing the functions of each of the embodiments mentioned above have been recorded is supplied to a printing apparatus, a computer (or a CPU or an MPU) of such an apparatus reads out the program codes stored in the memory medium and executes them.

In this case, the program codes themselves read out from the memory medium realize the novel functions of the invention. The memory medium in which the program codes have been stored constructs the invention. In the case where the program codes are supplied via an electrical transmission medium or the like, the program codes themselves construct the invention.

As a memory medium for supplying the program codes, for example, a floppy (registered trademark) disk, a hard disk, an optical disk, a magnetooptic disk, a CD-ROM, a CD-R, a magnetic tape, a non-volatile memory card, an ROM, or the like can be used.

Naturally, the invention incorporates not only a case where a computer executes the read-out program codes, so that the functions of the embodiments mentioned above are realized but also a case where an OS or the like which is operating on the computer executes a part or all of actual processes on the basis of instructions of the program codes, and the functions of the embodiments mentioned above are realized by those processes.

Further, naturally, the invention incorporates a case where the program codes read out from the memory medium are written into a memory equipped for a function expanding board inserted into a computer or a function expanding unit connected to a computer and, thereafter, a CPU or the like provided for the function expanding board or function expanding unit executes a part or all of actual processes on the basis of instructions of the program codes, and the functions of the embodiments mentioned above are realized by those processes.

As many apparently widely different embodiments of the present invention can be made without departing from the spirit and scope thereof, it is to be understood that the invention is not limited to the specific embodiments thereof except as defined in the appended claims.

As described above, according to the invention, the printing can be executed by the simple hardware construction while security is assured and the operability is maintained.

What is claimed is:

1. A printing apparatus which is connected to a host computer via a network and can send and receive E-mail by using a mail server function, comprising:
   job receiving means for receiving a print job from the host computer;
   job retaining means for retaining the print job received by said job receiving means;
   mail generating means for generating transmission mail including a key code for discriminating the print job retained by said job retaining means;
   mail sending means for sending the transmission mail generated by said mail generating means at a specific mail address by E-mail;
   mail receiving means for receiving reply mail to the transmission mail sent by said mail sending means; and
   output means for outputting the print job corresponding to the key code, if the key code included in the transmission mail sent by said mail sending means is the same as a key code included in the reply mail received by said mail receiving means.

2. An apparatus according to claim 1, wherein if the specific mail address is included in the reply mail received by said mail receiving means and if the key code included in the transmission mail sent by said mail sending means is the same as the key code included in the reply mail received by said mail receiving means, said output means outputs the print job corresponding to the key code.

3. An apparatus according to claim 1, wherein when the print job is received by said job receiving means, the specific mail address is designated by the host computer.

4. An apparatus according to claim 1, further comprising registering means for previously registering the specific mail address.

5. An apparatus according to claim 1, wherein the specific mail address is an address of a cell phone.

6. An apparatus according to claim 1, wherein the key code differs every print job and is set when the transmission mail is generated by said mail generating means.

7. An apparatus according to claim 1, wherein the key code differs every specific mail address and is set when the transmission mail is generated by said mail generating means.

8. An apparatus according to claim 1, wherein the mail server function is realized by either mail server means provided in said printing apparatus or a mail server apparatus connected to the network.

9. A control method of a printing apparatus which is connected to a host computer via a network and can send and receive E-mail by using a mail server function, comprising:
   a job receiving step of receiving a print job from the host computer;
   a job retaining step of retaining the print job received by said job receiving step into a memory unit;
   a mail generating step of generating transmission mail including a key code for discriminating the print job retained by said job retaining step;
   a mail sending step of sending the transmission mail generated by said mail generating step at a specific mail address by E-mail;
   a mail receiving step of receiving reply mail to the transmission mail sent by said mail sending step; and
   an output step of outputting the print job corresponding to the key code, if the key code included in the transmission mail sent by said mail sending step is the same as a key code included in the reply mail received by said mail receiving step.

10. A program stored on a computer-readable medium for allowing a computer to realize a control method of a printing apparatus which is connected to a host computer via a network and can send and receive E-mail by using a mail server function, comprising:

a job receiving step of receiving a print job from the host computer;

a job retaining step of retaining the print job received by said job receiving step into a memory unit;

a mail generating step of generating transmission mail including a key code for discriminating the print job retained by said job retaining step;

a mail sending step of sending the transmission mail generated by said mail generating step at a specific mail address by E-mail;

a mail receiving step of receiving reply mail to the transmission mail sent by said mail sending step; and an output step of outputting the print job corresponding to the key code, if the key code included in the transmission mail sent by said mail sending step is the same as a key code included in the reply mail received by said mail receiving step.

* * * * *

UNITED STATES PATENT AND TRADEMARK OFFICE
CERTIFICATE OF CORRECTION

PATENT NO. : 7,110,132 B2
APPLICATION NO. : 10/162603
DATED : September 19, 2006
INVENTOR(S) : Masahiro Takayanagi Page 1 of 1

It is certified that error appears in the above-identified patent and that said Letters Patent is hereby corrected as shown below:

COLUMN 2:
Line 46, "password" should read -- password for --.

COLUMN 5:
Line 39, "the" should read -- a --;
Line 39, "used" should read -- used for --; and
Line 42, "sent" should read -- sent for --.

COLUMN 6:
Line 47, "use" should read -- host user --.

COLUMN 7:
Line 56, "printer 63" should read -- printer 63 for --.

COLUMN 8:
Line 9, "he" should read -- the user --; and
Line 21, "was" should read -- is --.

Signed and Sealed this

Twenty-ninth Day of May, 2007

JON W. DUDAS
*Director of the United States Patent and Trademark Office*